(12) United States Patent
Mitevski

(10) Patent No.: US 10,505,987 B2
(45) Date of Patent: *Dec. 10, 2019

(54) SYSTEMS AND METHODS FOR IN-SESSION REFRESH OF ENTITLEMENTS ASSOCIATED WITH WEB APPLICATIONS

(71) Applicant: Nasdaq, Inc., New York, NY (US)

(72) Inventor: Vladimir Mitevski, Brooklyn, NY (US)

(73) Assignee: NASDAQ, Inc., New York, NY (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/925,319

(22) Filed: Mar. 19, 2018

(65) Prior Publication Data

US 2018/0213004 A1    Jul. 26, 2018

Related U.S. Application Data

(63) Continuation of application No. 15/354,048, filed on Nov. 17, 2016, now Pat. No. 9,923,929.

(60) Provisional application No. 62/258,204, filed on Nov. 20, 2015.

(51) Int. Cl.
  *H04L 29/06* (2006.01)
  *H04L 29/08* (2006.01)

(52) U.S. Cl.
  CPC .......... *H04L 63/20* (2013.01); *H04L 63/10* (2013.01); *H04L 63/108* (2013.01); *H04L 67/02* (2013.01); *H04L 67/10* (2013.01); *H04L 67/141* (2013.01); *H04L 67/42* (2013.01); *G06F 2221/2151* (2013.01); *H04L 2463/121* (2013.01)

(58) Field of Classification Search
  CPC ....... H04L 63/20; H04L 63/108; H04L 67/42; H04L 67/141; H04L 67/10; H04L 67/02; H04L 63/10; H04L 2463/121; G06F 2221/2151

See application file for complete search history.

(56) References Cited

U.S. PATENT DOCUMENTS

| | | | |
|---|---|---|---|
| 8,108,920 B2 | 1/2012 | Spelman et al. | |
| 2004/0083369 A1* | 4/2004 | Erlingsson | G06Q 20/401 713/176 |
| 2007/0239859 A1* | 10/2007 | Wilkinson | G06F 9/505 709/220 |

(Continued)

FOREIGN PATENT DOCUMENTS

WO    WO 2017/087796 A1    5/2017

OTHER PUBLICATIONS

Examination Report issued in corresponding Australian Patent Application No. 2016355205 dated Jul. 17, 2018.

(Continued)

*Primary Examiner* — Michael Pyzocha
(74) *Attorney, Agent, or Firm* — Nixon & Vanderhye, P.C.

(57) ABSTRACT

The described technology provides a capability to perform in-session updates to entitlements associated with a user's access to content served by a web application. The content may be from one or more external servers. The technology provides for automatically detecting changes to entitlements, and without requiring a user of an active session to initiate a new session, updating entitlement data in a memory such that subsequent requests for data made by the client in the same active session are serviced using the updated entitlements.

20 Claims, 17 Drawing Sheets

(56) References Cited

U.S. PATENT DOCUMENTS

| | | | |
|---|---|---|---|
| 2010/0313257 A1* | 12/2010 | Padinjareveetil | H04L 63/08 726/8 |
| 2011/0295727 A1 | 12/2011 | Ferris et al. | |
| 2012/0054625 A1* | 3/2012 | Pugh | G06F 21/41 715/736 |
| 2012/0096364 A1 | 4/2012 | Wilkinson et al. | |
| 2012/0246704 A1* | 9/2012 | Dorsey | G06F 21/105 726/4 |
| 2012/0275597 A1* | 11/2012 | Knox | H04L 9/0833 380/210 |
| 2012/0276867 A1 | 11/2012 | McNamee et al. | |
| 2012/0278903 A1* | 11/2012 | Pugh | G06F 21/604 726/28 |
| 2013/0198801 A1* | 8/2013 | Nishizawa | H04L 29/06768 726/1 |
| 2014/0180870 A1* | 6/2014 | Bombeck | G06Q 30/0609 705/26.35 |
| 2014/0181944 A1* | 6/2014 | Ahmed | H04W 12/06 726/8 |
| 2014/0344129 A1* | 11/2014 | Campbell | G06Q 40/02 705/35 |
| 2015/0113134 A1* | 4/2015 | Rehman | G06F 3/048 709/224 |
| 2015/0200953 A1* | 7/2015 | Vidhun | H04L 63/108 726/1 |
| 2015/0293764 A1* | 10/2015 | Visvanathan | G06F 8/36 717/102 |

OTHER PUBLICATIONS

International Search Report and Written Opinion in related application PCT/US2016/062764 dated Jan. 24, 2017.
Bloomberg, "Bloomberg API", Version 3.x, Developer's Guide, Jun. 30, 2014, Version 2.54, pp. 1-350.

* cited by examiner

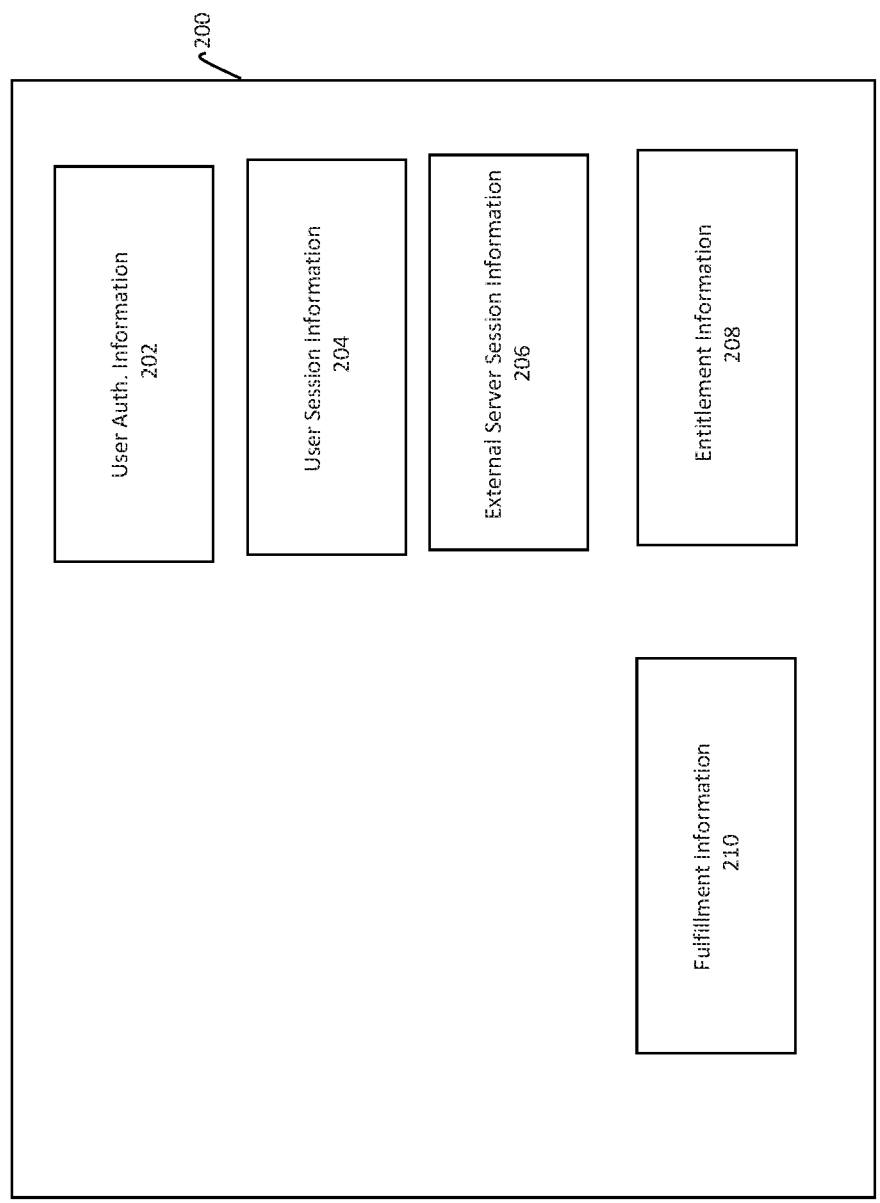

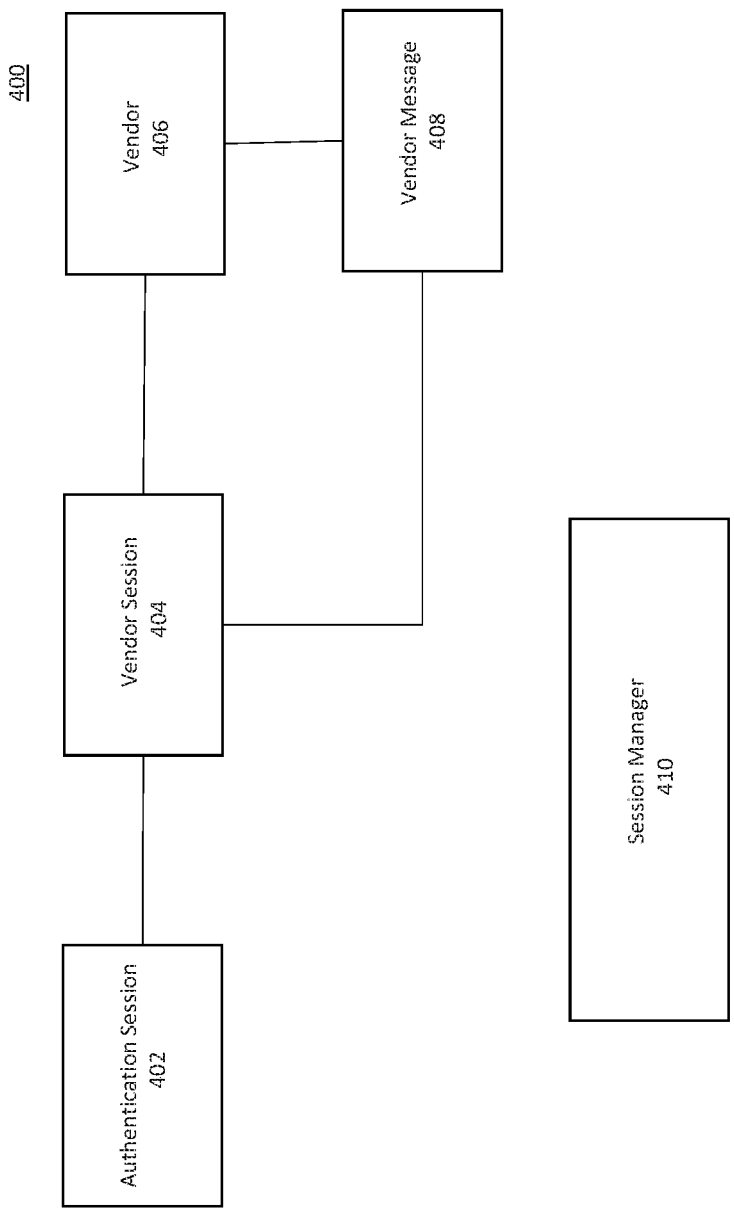

```
public virtual void Install(IWindsorContainer container, IConfigurationStore store
)
{
    container.Register(
        Component.For<IVendorSessionManager>().ImplementedBy<ModSessionManager>()
            .Named(ModSessionManager.MOD_VENDOR_NAME),
        ...
    );
}
```

FIGURE 8

```
/// <summary>
///     Finds a Vendor session for a vendor with given name. If active session is not found, new session can be created.
/// </summary>
/// <param name="authSessionId">
///     Authentication Session Id of an Active authenticated session to create vendor session for.
///     If active Authentication session with given Id is not found, exception is thrown.
/// </param>
/// <param name="vendorName">
///     The name of the vendor to create session for. If implementation of the IVendorSessionManager with
///     this name is not found, the method fails.
/// </param>
/// <param name="createIfNotFound">
///     If <c>true</c> and active Vendor session for given Authentication session is not found, new one is
///     created. Otherwise, if session is not found, returns <<>null</c>.
/// </param>
/// <param name="extendDuration">
///     If <c>true</c> and existing session is found, the duration of the session is extended by the current session duration.
/// </param>
/// <param name="duration">
///     The duration in seconds for the session to create. If it is not provided or 0, default duration for the vendor is used.
///     It is only used when new session is created. It is not possible to change duration for existing session.
/// </param>
/// <returns>
///     The model with VendorSession information
/// </returns>
[OperationContract]
[FaultContract(typeof (BaseApplicationFault))]
VendorSessionModel FindVendorSession(string authSessionId, string vendorName, bool createIfNotFound = true,
    bool extendDuration = true, int duration = 0);
```

FIGURE 9A

```
/// <summary>
///     Terminates a vendor session for a vendor with given name associated with given authentiction session id.
///     If active session is not found, this method returns <c>null</c>.
/// </summary>
/// <param name="authSessionId">
///     Authentication Session Id of an Active authenticated session to terminate vendor session for.
///     If active Authentication session with given Id is not found, exception is thrown.
/// </param>
/// <param name="vendorName">
///     The name of the vendor to terminate session for. If implementation of the IVendorSessionManager with
///     this name is not found, the method fails.
/// </param>
/// <returns>
///     The model with terminated VendorSession information if found
/// </returns>
[OperationContract]
[FaultContract(typeof(BaseApplicationFault))]
VendorSessionModel TerminateVendorSession(string authSessionId, string vendorName);
```

FIGURE 9B

```
/// <summary>
///     Updates entitlements of a Vendor session for a vendor with given name.
///     If active session is not found returns null.
/// </summary>
/// <param name="authSessionId">
///     Authentication Session Id of an Active authenticated session to update vendor session entitlements for.
///     If active Authentication session with given Id is not found, exception is thrown.
/// </param>
/// <param name="vendorName">
///     The name of the vendor to update entitlements for. If implementation of the IVendorSessionManager with
///     this name is not found, the method fails.
/// </param>
/// <returns>
///     The model with VendorSession information
/// </returns>
[OperationContract]
[FaultContract(typeof(BaseApplicationFault))]
VendorSessionModel UpdateVendorSessionEntitlements(string authSessionId, string vendorName);
```

FIGURE 9C

```
/// <summary>
/// Returns the session info loaded from vendor.
/// Includes up to date information about the session loaded from vendor.
/// </summary>
/// <param name="authSessionId">
///     Authentication Session Id of an Active authenticated session to update vendor session entitlements for.
///     If active Authentication session with given Id is not found, exception is thrown.
/// </param>
/// <param name="vendorName">
///     The name of the vendor to update entitlements for. If implementation of the IVendorSessionManager with
///     this name is not found, the method fails.
/// </param>
/// <returns>
///     The vendor status loaded directly from vendor.
/// </returns>
[OperationContract]
[FaultContract(typeof (BaseApplicationFault))]
string GetVendorSessionInfo(string authSessionId, string vendorName);
```

FIGURE 9D

```
/// <summary>
///     Creates a new Vendor session to be used for API calls to retrieve data on behalf of a given user.
///     It also creates an Authentication session for the user and given site Id.
/// </summary>
/// <param name="userId">
///     The UNID of user to create Vendor session for.
/// </param>
/// <param name="vendorName">
///     The name of the vendor to create session for. If implementation of the IVendorSessionManager with
///     this name is not found, the method fails.
/// </param>
/// <param name="siteId">
///     The Site Id used to create Authentication Session
/// </param>
/// <param name="duration">
///     The duration in seconds for the session to create. If it is not provided or 0, default duration for
///     the vendor is used. It is only used when new session is created. It is not possible to change duration
///     for existing session.
/// </param>
/// <param name="entitlementsFilter">
///     The optional filter for entitlements. If not <c>null</c>, only entitlements included in this list
///     are sent to vendor when creating session. Use vendor entitlement codes in this filter.
/// </param>
/// <returns>
///     The model with VendorSession information
/// </returns>
[OperationContract]
[FaultContract(typeof(BaseApplicationFault))]
VendorSessionModel CreateApiVendorSession(long userId, string vendorName, string siteId, int duration,
string entitlementsFilter)
```

FIGURE 9E

SYSTEMS AND METHODS FOR IN-SESSION REFRESH OF ENTITLEMENTS ASSOCIATED WITH WEB APPLICATIONS

CROSS-REFERENCE TO RELATED APPLICATIONS

This application is a Continuation of U.S. patent application Ser. No. 15/354,048 filed Nov. 17, 2016 (now U.S. Pat. No. 9,923,929 to be issued on Mar. 20, 2018) which claims the benefit of priority of the U.S. Provisional Application No. 62/258,204 filed on Nov. 20, 2015, the entire contents of which are incorporated herein by reference.

BACKGROUND

Web application deployments enable a large number of users to access one or more web applications and/or resources controlled by web applications. For example, a large corporation may deploy an enterprise software application ("web application") on one or more servers in its corporate network or other Internet-accessible computer, and enable all its employees and/or clients to access that application via the web. Web-accessibility of such applications provide employees and/or clients with the capability to access the application at any time and from anyplace having network connectivity.

Also, web applications are accessible using information processing devices of different types. The same user may sometimes access a web application using different information processing devices. For example, a user may attempt to access the web application using his smartphone while also simultaneously accessing it via a desktop computer. Sometimes the web application may be accessed by the same user using two different browsers (e.g., Chrome by Google and Internet Explorer by Microsoft).

Thus, web application deployments provide numerous benefits related to accessibility and availability. The capability for the same user to simultaneously access the web application using more than one device or one browser, and/or other client application, may improve aspects of a user's interaction with a web application, such as efficiency and convenience.

Many enterprise web applications use data from service providers (e.g., third party data sources), such as subscription services. The increased convenience to users enabled by advances in software technology and network technology, if not properly controlled, can result in misuse of such third party services by users of an enterprise. For example, when a web application which utilizes data obtained from a subscription services for which a fee is charged on a per user basis or per sign-on basis, some users may attempt to reduce fees paid by keeping sessions/connections alive for long durations, thus potentially depriving the provider of revenue. Such misuse of access privileges can also negatively affect the system capacity available for fee-paying users and/or negatively affect the system performance experienced by users.

Therefore, as enterprise web applications deployments grow and their use data sources increase, technology is needed for ensuring that specified conditions on user access privileges are more closely adhered to.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The described technology relates to controlling access to web application features and resources. The described technology provides a capability to improve how closely users conform to specified access privileges. In some example embodiments, an improved capability is provided to control user sessions for web applications such that they more closely conform to entitlements specified regarding that user's and/or group of users' access to various features of a web application. More stringent control of users' actual use of certain features of a web application such as data obtained from a third party subscription service in accordance with predetermined specifications can, for example, enable the service provider to receive revenues more closely aligned with a user's actual use of the web application, and it may also improve the overall application and/or server performance by reducing resources wasted due to maintaining sessions that remain unused for long periods of time. At least some example embodiments provide for, upon detecting a change to configured entitlements, automatically refreshing entitlements stored for access authorization lookup so that on-going sessions can continue without having the user perform sign off and sign on.

This summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIG. 2 illustrates some of the data tables maintained by the one or more servers shown in FIG. 1, according to some example embodiments;

FIG. 4A illustrates some classes used in implementing session configuration, according to some example embodiments;

FIG. 8 illustrates part of example software code 800 for dynamically finding a session manager by name using an inversion container, according to some example embodiments;

FIG. 9 (FIGS. 9A-9E) illustrates templates of various methods that may be used in interactions described in relation to FIGS. 5-7, according to some example embodiments.

DETAILED DESCRIPTION

The technology described herein relates to, among other subjects, controlling a user's access to and/or use of various features of one or more web applications. Some example embodiments provide an improved capability to more accurately conform a user's use of a web application to predetermined specifications and/or conditions. Embodiments can be used, for example, by an enterprise to improve employees' adherence to conditions of access/use set for web applications hosted on enterprise web servers. Embodiments may be particularly useful when the enterprise, through its own servers, provides access to content (e.g., application data served or used by the web application) from external subscription servers or other networked electronic resources. Embodiments overcome limitations of previously known enterprise systems by which, even when a user's entitlements are changed, the user can continue to use the web application without regard to the changed entitlements until he/she signs off or otherwise terminates the session. At least some example embodiments provide for, upon detecting a change to configured entitlements, automatically refreshing entitlements stored for access authorization lookup so that on-going sessions can continue without having the user perform sign off and sign on.

An "entitlement" as used herein is a specification of one or more authorizations indicating, one or more of, accessibility of a particular content source or set of content sources, accessibility of particular types of content, accessibility of content under selected conditions (e.g., time of day, durations, etc.), accessibility of content through selected web applications, and the like. The content may be any type of digital content. The specification of one or more authorizations can be configured per user, per group of users, and/or for all users. The specification of one or more authorizations can be represented in a data structure such as, for example, a string, a bit field, an array, an object with attributes, a record with plural fields, a complex data structure, etc. The specification of authorizations may be in the form of an accessibility status (e.g., yes/no flags, range of values, or set of values) for each of one or more resources to which access is controlled.

Figure 1:
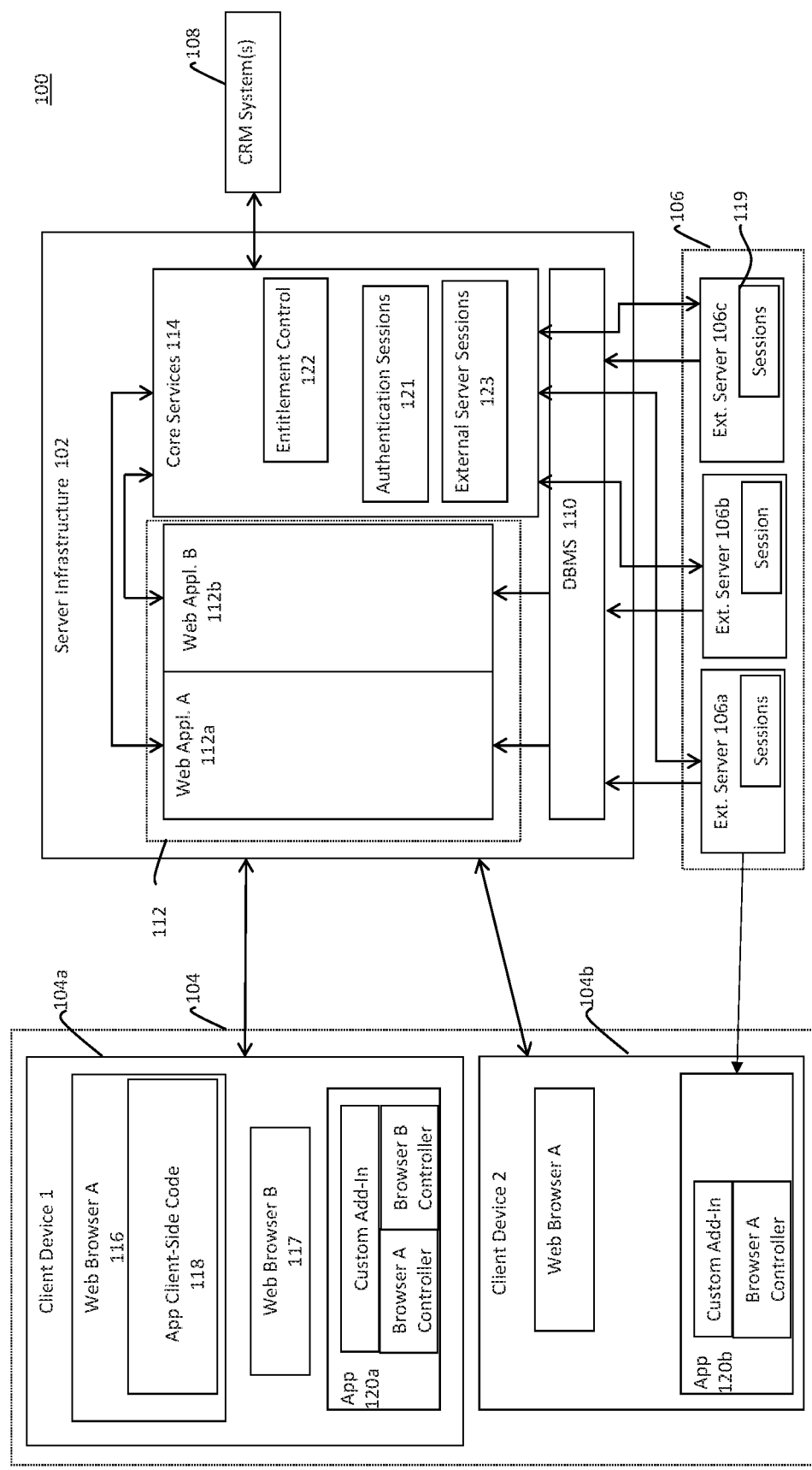
FIG. 1 illustrates a computing environment having one or more client devices, and one or more server devices executing web applications, according to some example embodiments.

FIG. 1 illustrates a non-limiting computing environment 100 including one or more servers 102 (also referred to herein as "server infrastructure") and one or more clients 104, according to some embodiments. The one or more servers 102 communicate with clients 104 and one or more external servers, so that users on clients 104 can access web applications 112 executed on the one or more servers 102. Servers 102 may also communicate with one or more internally used systems such as, for example, a document management system 108. The communication between the servers 102, clients 104, external servers 106, and document management system 108 may be over the internet or any other communication network.

Servers 102 may be implemented on one or more physical server computers that are communicatively connected to each other over a network. The one or more physical server computers may be geographically co-located or distributed. Servers 102 may include a database management system 110 and one or more server-side web applications 112 (e.g., 112a and 112b) and a core services application 114.

Each web application 112 may be designed and operated according to a three-tier model of a web server, application server and database. As in conventional systems, the web server of each web application 112 includes the capability to communicate with external entities via HTTP and other protocols such as JSON, HTML, XML, JavaScript, Cascading Style Sheets (CSS), etc. The application server of each web application 112 provides the processing logic for the application, and the database of each web application 112 provides for storing and reading data.

Web applications 112 may interact with the core services application 114 for managing user authentication, with clients 104 (e.g., 104a and 104b) for receiving input from and for transmitting out to, and the database management system 110 and/or external servers 106 for obtaining information to be provided to the requesting client applications running on clients 104. In some embodiments, some or all of the information provided to requesting clients may be generated by the web application itself and/or other web application executing locally on the same one or more servers 102.

Core services application 114, which may also be designed and operated according to the three-tier model described above, may provide one or more services that are commonly used by the web applications 112. Example services that may be provided by core services application 114 include authentication of users, management of sessions, etc.

In some embodiments, core services application 114 provides session management to the external servers 106. For example, in a use case where two or more web applications 112 obtain data from a particular external server 106, core services application 114 may provide the capability to manage sessions between servers 102 and the external servers 106 (referred to as "external server sessions" or "vendor sessions") in accordance with corresponding other sessions between clients 104 and servers 102 (referred to as "user sessions" or authentication sessions"). Each external server may store a copy 119 of a part of an external server session table maintained at the server 102.

Web applications 112 operate to receive requests from clients 104, perform processing and/or obtain information from the database 110 and/or external servers 106, and respond to clients 104 with a result from the processing and/or obtained data. Web applications 112 may utilize core services 114 for administering users, user sessions and/or external server sessions.

A web application may comprise one or more client-side components and one or more server-side components. Client-side components of a web application may operate to provide for handling the user interface by performing presenting (e.g., displaying) of information on a user interface device; receiving user input, etc. Server-side components may provide for authentication, service metering, generating or obtaining information to be presented to the user in accordance with received user inputs.

Embodiments are not limited to particular types of web applications. Web applications that may be used in embodiments include those designed according to the single page application (SPA) model, any non-SPA model, or a combination of both.

SPAs are web applications that operate within a single web page. In an SPA, the content for a single web page is sent by the web server to the web browser, and that page is loaded/rendered, as described above with the traditional web application. Subsequently, when the user wants to view different content within the application, the user will click a hyperlink or input on the page. But instead of navigating to a different page as in non-SPA web applications, the same page will remain loaded, and its content will be dynamically updated. This dynamic updating may be accomplished in a number of different ways; it may involve, for example, the web browser performing background HTTP fetches for new content, updating the Document Object Model (DOM) of the page (via JavaScript code), and/or other techniques.

AngularJS® is a web application framework that is used to create SPAs. At the web browser, AngularJS JavaScript libraries are loaded and interpret HTML templates which are embedded with AngularJS scripts and other AngularJS coding constructs, such that the resulting pages behave as defined in the templates. Other frameworks (e.g., Backbone.js, Ember.js, and React) may also be used for SPA applications.

In some non-SPA web application models, a web application includes a number of different web pages. To render a particular web page within the application, the following set of interactions is performed: a web browser at a client device requests (using an Hypertext Transfer Protocol (HTTP) message) a particular web page from a web server; in response, the web server transmits (using HTTP) the code for the page back to the web browser, the code including, e.g., HTML, JavaScript®, and Cascading Style Sheets (CSS) code; the web browser then loads the code and renders the page, thereby enabling a user to view and interact with the page. When the user subsequently wants to view different content within the application, the user will click a hyperlink or input on the page that points to a different page within the application, and then the above-mentioned request/response/load/render procedure is performed for the different page.

The database management system 110 (sometimes also referred to herein simply as the database), may be a commercially available DBMS, or other data record management system. Although shown as a single DBMS, DBMS 110 may include one or more separate databases. Embodiments are not limited to any type of database management system.

Clients 104a and 104b can be configured to execute the same or different client applications. In the illustrated example embodiment in FIG. 1, first clients 104a includes a web browser A 116 and a web browser B 117. Client 104a may also have stored on it a client-side app 120a which is a native app. When browser A 116 is used to access a web application 112, client-side code 118 for a web application 112 executed within browser A 116. In the same example embodiment, the second client 104b is configured to execute an app 120b which may be a native app. Client 104b may have one or more browsers (e.g., as shown browser A) in addition to the native app 120b. The client-side code 118 and app 120 may perform client-side processing for a corresponding web application on server 102.

As illustrated in FIG. 1, when a client application (e.g., 116/118 or 120a/120b) communicates with a web application 112, the web application 112 may obtain any information requested by the client from one or more external servers 106 and provide to the client application. In some embodiments, some or all of the information provided to the requesting clients 104 may be generated locally by servers 102.

Clients 104 may include personal computers, mobile computers, tablets, smartphones, and other electronic devices. In some example embodiments, any electronic computing device including at least a display, an input device for user input, and a communication interface for communicating with the server device may operate as a client device.

The external servers 106 (e.g., 106a, 106b, 106c) may include one or more servers controlled by an entity (e.g., administrative entity) different from the entity controlling the one or more servers 102. For example, one or more of the external servers 106 may be managed by a service provider or vendor that, under a predetermined (e.g., previously agreed upon by an enterprise and a vendor) service specification, provides users on client devices 104 access to various application data and/or analysis. The service specification may be based upon conditions relating to one or more of a number of users, type and amount of information, duration of use, frequency of use etc., of the access to the external servers.

It should be understood that the software modules shown in FIG. 1 are stored in and executed by hardware components (such as processors and memories), and it should be further understood that, whenever it is described in this document that a software module performs any action, that is done solely for ease of description, and the action is in actuality performed by the underlying hardware according to the instructions and data that comprise the software module. Further details regarding example hardware components that may be used to implement the features described herein are provided below with reference to FIG. 10, as well as in other places in this document.

In an example implementation, the computing environment 100 may be associated with an enterprise, such as, for example, Nasdaq Corporation. Example web applications 112 may include real-time market analysis application and a client account status application. Users of web applications 112 may include financial analysts and/or other employees of the enterprise. Core services application 114 may provide common services such as administration (e.g., creating user accounts, administering entitlements, etc.) authentication (e.g., create/manage sessions for users to access certain services, etc.) and authorization (e.g., check whether user is entitled to access certain services or features, etc.) for users. Core services application 114 may, among one or more other processes, include an entitlement control process 122 which provides for administering entitlements by, for example, providing for updating a database (not shown separately in FIG. 1) with the current status of respective entitlements. In some embodiments, entitlement control 122 may provide for maintaining one or more data structures representing selected entitlements, for example, in tables 119 on external servers and/or tables 210 (shown in FIG. 2).

Servers 102 may represent one or more servers and the associated infrastructure used by the enterprise for running web applications 112, core services application 114 and associated software. The document management system 108 may include a customer relationship management application that communicates with the web applications and/or core services application for delivering services to the enterprise's users.

In this example implementation, external servers 106 each may be operated by a respective vendor of application data. Each vendor may provide application data such as real-time financial market related information to entities such as Nasdaq Corporation under some sort of subscription or service specification (e.g., an agreed price based upon type of data, amount of use, number of users, etc.).

When an analyst using client 104a accesses the real-time market analysis application on servers 102, an SPA may be displayed on the client device, and various real-time or value-added information from the vendors (e.g., such as those operating external servers 106) and/or the corporation's internal analysts etc., can be displayed in the one or more portions of the displayed SPA.

External servers 106 (e.g., vendors), although providing information requested users and capable of identifying the users accessing its services, may rely upon the enterprise (e.g., as the "vendor of record") to ensure users' compliance with the terms of use specified, for example, in a service specification agreed between the enterprise and the vendor associated with a particular external server 106. For example, based upon the agreement with a particular vendor, the core services application may be used to assign entitlements to the users and/or web applications to access/obtain data from that particular vendor. Core services 114 may maintain a table 121 of user sessions. Core services 114 may establish sessions with external servers 106 for respective users who have a valid entitlement to a particular external server's data. A table of external server sessions 123 may be maintained by core services application 114. Core services application 114 may cause, or may maintain, at least a part of external server session table (e.g., table 119) at each vendor. When a user of a client device 104 requests data from the vendor, for example, through one of the web applications on server 102, the vendor may, in some embodiments, check its copy of the session table and request core services 114 for verification that the requesting user's entitlement (e.g., the one or more active entitlement records assigned to that user) is valid, and would provide the requested data if the entitlement is valid. In some embodiments, the external server 106 may provide the requested data after checking the entitlements for the user in its local copy of the external server session table 119 and without further checks with server 102. In yet other embodiments, an external server 106 may provide the requested data, without checking its local memory for the user's entitlements, after checking with server 102 as to whether the user has a currently active entitlement for the requested data. These checks may be performed for every data request or only for requests for selected data.

FIG. 2 illustrates an example collection of data tables 200 that may be maintained by and/or is accessible to core services application 114, according to some example embodiments. Although referred to as "tables", the data discussed in relation to FIG. 2 may be stored in a memory in any form or data structure accessible to core services application 114 and/or other application configured to make use of the data.

User authentication information 202 may include a table of user authentication information, that is accessed by the core services application 114 in order to authenticate a user during, for example, sign-on to one or more web applications. For each user, identifying information, such as, for example, any of user Id, password, user-specific cookies, and/or entitlements associated with the user etc. may be maintained in user authentication information 202.

User session information 204 includes a record of the currently active sessions (as noted above, referred to herein as "authentication sessions" or "user sessions") by which users, such as users on client devices 104, communicate with a web application on server 102. User session information 204 may be in the form of a table with each row representing an active session. In some embodiments, inactive sessions (e.g., recently deactivated/cancelled sessions) too may also be in the table. The user session information table 204 may include, for each session, attributes such as user Id, web application for which the session serves, client, authenticated session identifier and/or one or more cookies. The table may also include start and end times for the session, and a current status. The status may, for example, indicate whether the session has been terminated or is currently active, and if terminated, a reason for the termination.

External server session information 206 stores the sessions (as noted above, referred to herein as "external server sessions" or "vendor sessions") pertaining to the respective external servers 106. In some embodiments, external server session information 206 may be maintained in data structures for each external server 106. In some embodiments, each table 206 or portion thereof can be provided to an external server 106 so that the permissions and/or entitlements associated with a request can be checked locally by the external server when the request is serviced. In some embodiments, sessions between the server device 102 and external servers 106 may be based on user session information 204, and a separate table may not be necessary. Attributes stored for each external server session may include attributes such as user Id, an external server session identifier, start and end times for the session, and a current status. The status may, for example, indicate whether the session has been terminated or is currently active, and if terminated, a reason for the termination.

Entitlement information 208 includes information regarding entitlements associated with access to the web applications and/or features thereof. Entitlements, as described above, specify the scope of access to one or more external servers (or other resources) for a user or group of users. For example, a row in a table of entitlement information 208 may specify the external servers (vendors) and the types of data to which a particular user or group of users have access. Entitlements may also specify whether simultaneous access by more than one client application (e.g., simultaneous access via a browser and a native app) by the same user is allowed for a particular web application.

Entitlement information 208 may be maintained by an entitlement control system 122. The entitlement system 122 may interact with other systems such as an order fulfillment system (not separately shown) that manages orders for data from external servers. In some embodiments, the order fulfilment system may specify types and amounts of services provided by a vendor, which may be stored in a fulfillment information table 210. The entitlement system 122 and/or core services 114 may configure entitlements corresponding to the services available, and provisioning a user (e.g., a user using a client device 104) to access, from a web application, data from one or more external servers 106 based on the configured entitlements. The provisioning may include, for the order, a step of creating an entitlement record (e.g., one or more rows in a table in entitlement information 208) and associating the user, the web application, and/or the external server with the created entitlement record. In other words, according to some example embodiments, core services 114, of which entitlement control 122 may be a part of, links a product, such as a web application 112, to a user who is then linked to one or more entitlements. The implementation of relating the product to the user who is then related to the entitlements, enables updating of active sessions with respect to entitlements when user events are detected. The provisioning may be performed prior to the corresponding user and/or vendor sessions are formed.

Figure 3A:
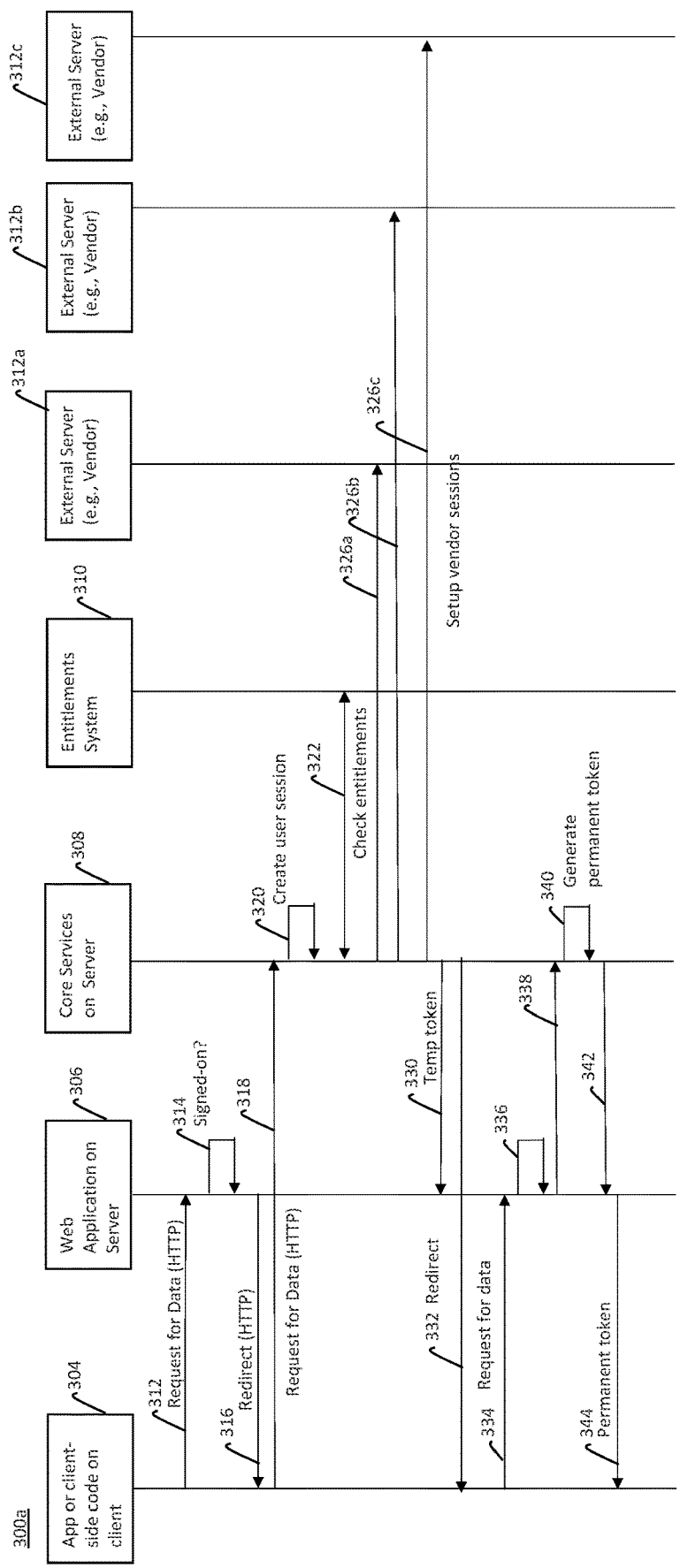
FIG. 3 (FIGS. 3A-C) illustrates flow diagrams showing interactions between system entities when a user is signed-on, entitlement checking during access to web applications, and updating of entitlements, according to some example embodiments.

FIG. 3 is a flowchart illustrating a process 300a (processes 300a, 300b and 300c are collectively referred to as process 300) including interactions between a client 304 such as, for example, client 104a, web applications 306 and 308 on a server device such as, for example, server device 102, and external servers 312 (312a, 312b and 312c), such as, for example, external servers 106, according to some example embodiments.

Process 300a may be entered when a user using client 304, at operation 312, navigates a browser to a web application 306 executing on a server device such as server 102. For example, the user may enter into the web browser, a predetermined URL (uniform resource locator) for accessing the web application. Alternatively, the browser may be directed to the web application when the user "clicks" on a link displayed on a web page. The web page of a web application encountered upon first arrival to the web application is referred to as the "landing page". For example, for a web application named "IR Insights", the landing page may be at an address such as irinsight.nasdaq.com known to the user.

Having navigated to the landing page of the web application using the web browser (e.g., Internet Explorer browser), at operation 314, in response to the HTTP request, the web application determines whether the user is currently signed-on. The determination may be based upon whether or not an entry corresponding to the user exists in a table of currently active authentication sessions maintained in a memory by web application 306 and/or core services application 308. An entry, for example, may have parameters corresponding to the user's userId, a client device identifier, and a web application identifier associated with a session identifier. The web application determines if a corresponding currently active session and cookie exists. If an active session (and/or cookie) is not found, then the web application may generate a temporary token and send the token to the client device. In some embodiments, the temporary token may be pushed to the client along with the domain cookie for the web application.

If, at operation 314, it is determined that the user is already signed-on to the web application, process 300a proceeds to the operation 334.

If, at operation 314, it is determined that the user is not currently signed on, then at operation 316, web application 306 redirects client 304 to go to a login page. According to an embodiment, the redirection is performed by sending to the client a HTTP redirect message directing the browser on the client device to the login application. A known identifier for the web application can be passed with the redirect message, so that the login application can subsequently, after the login process is complete, redirect the client back to the web application. According to an embodiment, a globally unique identifier (GUID) assigned to the web application can be used as the identifier passed with the redirect messages.

At operation 318, based upon the received notification to redirect, the client navigates the browser to the login page. When accessing the login application, the browser may identify the web application (which redirected the browser) by including the corresponding GUID (which it previously received in the redirect message from the web application) in the HTTP request. The login application prompts the user for login credentials. According to an embodiment, the login credentials include a username and password.

At operation 320, core services application 308 creates a user session representing the user's sign-on. The creation of the session may include adding a record to the session table, such as, user session information table 204. A record representing a session may include a session identifier that uniquely identifies the session and user identifier. Other aspects such as the client device, one or more web applications for which the sign-on is valid, and type of client application may also be included in the session record. Additionally, in some example embodiments, the entitlements associated with a particular session may either be indicated in the session record, or otherwise made identifiable and/or accessible via (e.g., linked to) the session record.

At operation 322, entitlements for the user are checked to determine whether the user is authorized to access one or more selected features of the web application. The determination whether the user has the necessary entitlements for accessing the web application may be made by core services application 308 and/or an entitlement control application 310, for example, by accessing a database of entitlements (e.g., table 208) either stored in, and/or accessible to, the servers.

If the necessary entitlements for running the web application for the user are not found, a message (not shown in FIG. 1) may be returned to the user indicating that access to the web application is denied because, for example, the entitlements are inadequate.

In some example embodiments, the creating of a user session record at the server may, in addition, include creating or updating one or more vendor sessions. Creating vendor sessions may include one or both of storing vendor session records locally at the server (e.g., server 102) and storing vendor session records in one or more external servers (e.g. external servers 312). Accordingly, in some example embodiments, at operations 326a, 326b and 326c (collectively 326), the core services application 308 updates session tables or parts thereof maintained on external servers 312a, 312b, and 312c (collectively 312), respectively. The updating may be performed in accordance with an application programming interface (API) provided/published by the respective external server or vendor. Upon receiving the updates or new records, each receiving external server 312 may store the received records and/or information in a memory.

In some embodiments, core services application 308 and/or entitlement control application 310 may determine which of the external servers are to be updated and which are not to be updated. In some instances, one or more of external servers 312 may not be updated with new session information if the corresponding external server does not provide the data that is to be provided. For example, although external server 312c may provide data for a data feed A on an SPA presented to the user by the web application, if the user, although entitled to access the web application and one or more other data feeds used by the web application, is not entitled to data feed A, then core services application 308 and/or entitlement control application 310 may determine that the session records at external server 312c are not to be updated if the update applies only to data feed A.

At operation 330, the login application provides the web application with a temporary token. This may be performed using HTTP POST message, with the temporary token specified in key/value pair form. In some embodiments, an anti-forgery token can be provided along with the temporary token.

At operation 332, the login application redirects the client to the web application using an HTTP redirect message and the identifier (e.g., GUID) of the web application received earlier. The login application may also generate a cookie containing the temporary token. In some embodiments, the cookie may also include the anti-forgery token.

At operation 334, the client, having been redirected by the login application, navigates to the web application and presents to the web application the one or more cookies containing the temporary token.

At operation 336, the web application verifies the token.

At operation 338, the web application requests the login application to generate a permanent token.

At operation 340, the login application generates a permanent token.

At operation 342, the login application returns the generated permanent token to the web application.

At operation 344, the web application transmits the permanent token to the client.

Figure 3B:
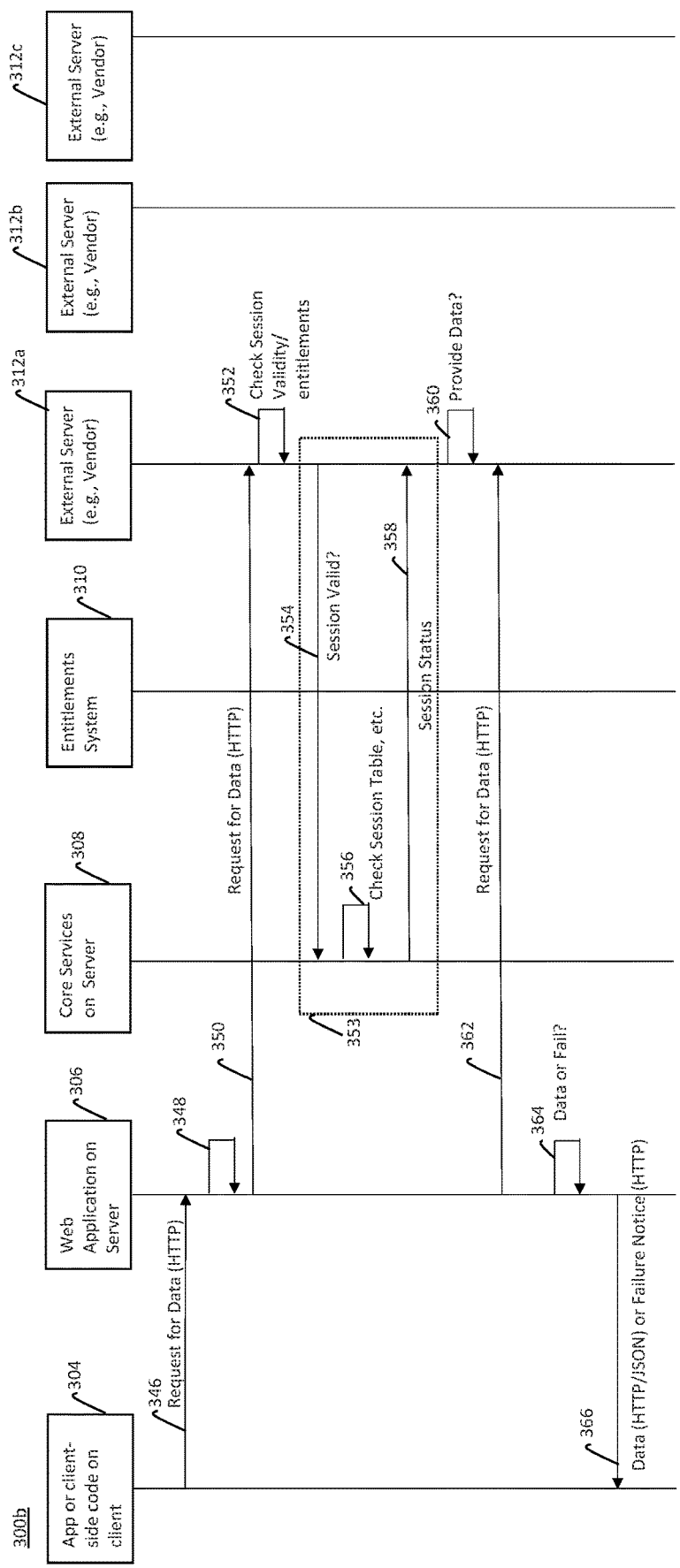

FIG. 3B illustrates a process 300b (a part of process 300) for an app or client-side code on a client 304 to access data from an external server 312, according to some example embodiments.

Process 300b may be entered after an app or client-side code on client 304 has signed-on to the web application 306, and when the access to data from an external server is required by the app of client-side code on the client.

At operation 346, client 304, transmits a request for data to the web application 306 on server 102. The request may include a cookie which was previously obtained for the session and stored in the client. The request may indicate the data requested.

At operation 348, web application 306 receives the request from the client 304. Processing at operation 348 may include determining from where to obtain the requested data. Processing may also include locally determining at least some of the requested data.

At operation 350, web application 306 transmits the request for data to the external server as determined at operation 348 and/or as specified in the request from client 304.

At operation 352, the external server 312 receives the request. In some embodiments, the processing at operation 352 may include checking a locally maintained table for a valid session. The check may be based upon a cookie and/or user identifying information from the request. If the check from the locally maintained table indicates that the user is authorized to receive the data, then processing may proceed to operation 360 in order to provide the requested data.

The locally maintained table may be controlled by the core services 308 such that it represents the most up to date status of user entitlements. As described elsewhere in this document, some embodiments provide for core services 308 to cause refreshing of entitlements in on going sessions when a user event or other change results in one or more entitlement changes at the enterprise's servers.

In some other example embodiments, in addition to or in place of checking the locally maintained table, an optional operation 353 may be performed in order to obtain confirmation from core services application 308 regarding the request for data. Operation 353 may include operations 354-358. At operation 354, the external server transmits a request to core services 308 requesting for confirmation of the request for data.

At operation 356, core services application 308 checks the session table and/or other data structure to determine if the data request is authorized.

At operation 358, a status is reported to the external server.

By providing for the most up to date entitlement information for a user to be refreshed in any cache and/or other memory checked by an entitlement checking processes at the enterprise's server and/or at the external server, embodiments enable controlling user's access to various application features.

At operation 360, based at least upon whether the request for data is properly authorized, the external server determines to provide the data to the client. Alternatively, if it was determined that the request was not properly authorized, then a determination is made to not provide the data.

At operation 362, a response is transmitted to web application 806 based upon whether the data is to be provided to the client or not. The response may either include the requested data or include a failure notice.

At operation 364, the web application determines, whether the client's request has succeeded or failed.

At operation 366, the web application transmits a response to the client.

Figure 3C:
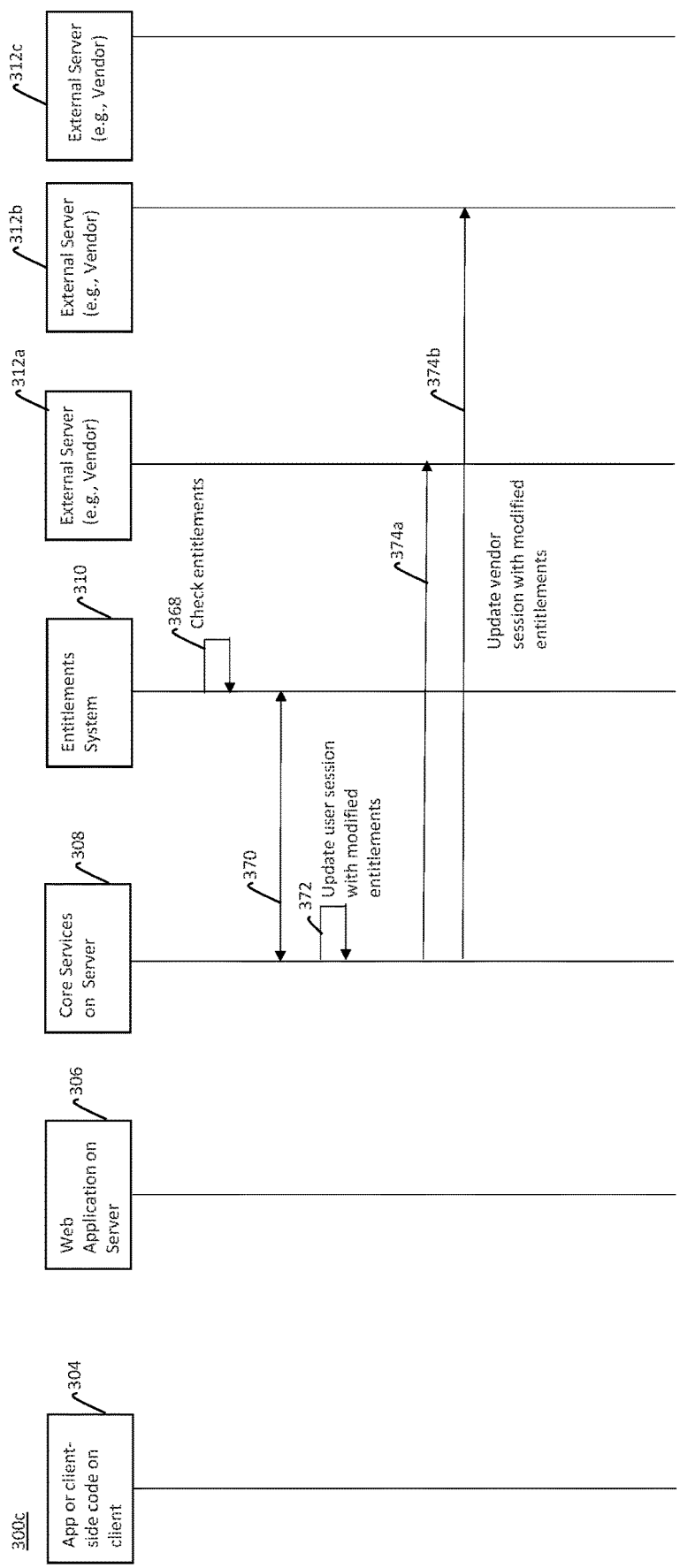

FIG. 3C illustrates a process 300c for an app or client-side code on a client 304 to access data from an external server 312, according to some example embodiments.

Process 300c may be entered after an app or client-side code on client 304 has signed-on to the web application, and when the access to data from an external server is required by the app of client-side code on the client.

At operation 368, the entitlements associated with the user are updated. This update may be performed by the entitlement control application 310. In some embodiments, the entitlement control application may be a process in core services application 308. The update may include updating a database or other data structure stored in the server.

At operation 370, core services 308 is notified regarding the update to entitlements, and determines whether the entitlement changes should be reflected in the authentication sessions and/or the vendor sessions.

At operation 372, the user sessions are updated accordingly.

At operation 374 (374a and 374b), respective ones of the vendor sessions are updated.

The subsequent processing is not shown in FIG. 3C. However, a person of skill in the art will understand that the client 304 may make subsequent requests to web application 306 for data and processing can proceed in a manner similar to that shown in FIG. 3B for servicing that request. However, when the external server checks its local tables to determine whether the user possesses the entitlements required for the requested data, the entitlements in the locally maintained tables are consistent with the changes effected at operation 368.

FIG. 4A illustrates a part of class diagram 400 according to some example implementations. The classes shown in diagram 400 may interact with each other to maintain user and/or vendor sessions. After a user is authenticated upon sign-on, web applications accessed by the user over a given authentication session can request a session to a particular vendor. If a session for the requested vendor does not exist, a call may be made to the vendor API to create the corresponding vendor session and return session Id. The vendor session is then maintained in correspondence with the authentication session. For example, one or more records may be stored in a memory associating the vendor session with the authentication session. In some embodiments, by default each vendor session is configured to last for the duration of the corresponding authentication session. When the authentication session is subsequently terminated, the corresponding vendor session is terminated as well. Core services 114, in some embodiments, implements a generic vendor session framework. Vendor specific implementations can be provided and plugged-in using, for example, dependency injection container registration.

An authentication session class 402 represents an authentication session, and may include an authentication session identifier, user identifier, authentication session creation date and/or time, authentication session end date and/or time, an indication whether the authentication session is temporary, and/or an identification of the application or application group. When a web application performs entitlement checks, some or all entitlements configured for the application are cached. When changes are made to the entitlements assigned to the user, it is important to refresh the entitlements cache as soon as possible to reflect the entitlements change. In some embodiments, the authentication session class may include an EntitlementsModifiedOn attribute. When an authentication session is established, this attribute is set to the timestamp of when the entitlements have been last modified for the user. When entitlements are modified for a user the EntitlementsModifiedOn date is updated for all active authentication sessions (e.g., by updating corresponding instances of authentication session class) for this user. When EntitlementsModifiedOn is updated for an authentication session instance, all associated vendor session instances 404 are notified of the entitlements change. If specific vendor supports updating entitlements for active sessions, a call is made to the vendor API to update user entitlements (for example, Markit OnDemand™ API supports updating current session entitlements). This entitlement update technique may be used, for example, in process 300c shown in FIG. 3C. On every request to the web application, a call may be made to authentication session service 402 to validate that current session is active. This call may return the session active status and EntitlementsModifiedOn timestamp. If this timestamp is different from cached timestamp, entitlements cache for the user is invalidated and current entitlements are reloaded.

The vendor session class 404 represents a vendor session, and includes a session identifier, creation date and/or time, expiration date and/or time, an indication whether the session is terminated, an indication of duration, and an indication of the associated entitlements. When a vendor session is created, it is stored in vendor session entity 404 associated with authentication session 402. When entitlements are modified for a user, all active vendor sessions are updated with new entitlements which are propagated to the vendor by calling a corresponding vendor specific API.

The vendor class 406 represents a vendor and defines metadata about the vendor, including one or more of name and default session duration. The class 406 includes a vendor identifier, and a session duration.

The vendor message class 408 represents messages transmitted between the server and the vendor. Class 408 includes a creation date and/or time, a message type, a message code, and the message content. A vendor instance is created for each specific external vendor. Each call to vendor API is logged in the vendor message entity.

The vendor session manager class 410 can be used for managing vendor sessions. Class 410 may include methods for creating a vendor session, terminating a vendor session, extending a vendor session, updating a vendor session, and to load session information. A vendor session manager interface may define a generic vendor session API for creating, updating and terminating sessions. A vendor specific implementations of this API need to be registered in the dependency injection container for each vendor using named service matching vendor name. For example, Markit OnDemand™ implementation ModSessionManager is registered for a vendor session manager interface using "MOD" vendor name as shown in FIG. 8.

Figure 4B:
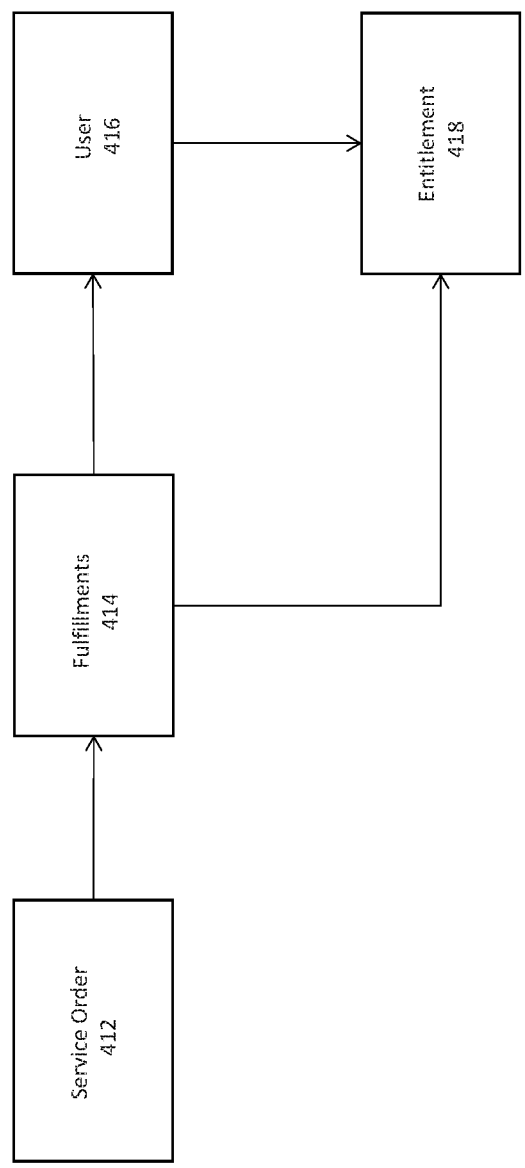
FIG. 4B illustrates some classes used in implementing entitlement configuration, according to some example embodiments.

FIG. 4B shows some classes that, according to some example implementations, interact with each other to associate entitlements with users and/or parts of an enterprise's fulfillment system or the like. Such association of entitlements with users may be performed, for example, for any of operations 320-326 shown in FIG. 3A when a user is signed-on to an application.

According to some embodiments, a service order class 412 represents an order, in association with a web application for data from one or more vendors. A fulfillments class 414 represents the services that vendors have agreed to provide. An entitlements class 418 represents each entitlement corresponding to ones of the fulfillments. A user class 416 represents a user.

Each service order instance 412 may be associated with (e.g. linked to) any number of fulfillment instances 414. This one-to-many relationship between service order instances 412 and fulfillment instances 414 corresponds, for example, to an enterprise purchasing access to a vendor data feed for plurality of users.

Each fulfillment instance 414 may be associated with one user instance 416. However, in some embodiments, a user instance 416 may be associated with a plurality of fulfillments 414, because a user of a web application may receive data from more than one vendor. A plurality of entitlement instances 418 may be associated with each user instance 416.

In some embodiments, when a user session is created upon a sign-on event to a web application, a corresponding user object is associated with one or more fulfillments (e.g., associated a respective fulfilment for each vendor whose data is accessed by the user) available for that web application. The user can be associated with one or more entitlements. In other words, according to some embodiments, a user is bound to a fulfillment and one or more entitlements.

As an example, the service order instance 412 may represent a request for 10 users to access the real time data feed of vendor A. Each of two fulfillment instances 414 represents a facility provided by vendor A for one user from the enterprise to access its data feed. An entitlement instance 418 provides a data structure identifying an access level to each of one or more aspects of the data feed (e.g., data sub feeds). When a user is provisioned, a user instance 416 may be associated with one of the fulfillment instances 414 and also with a corresponding entitlement instance 418.

This manner of associating the fulfillment to user and the user to entitlements facilitates efficient monitoring of how fulfillments and entitlements are adjusted in response to user events. For example, if user A's status is changed so as to no longer be authorized to receive real time data from vendor A, then core services 114 or entitlement control 122 changes the entitlements 418 for vendor A's data and also the fulfillments 414 appropriately to reflect the changed authorizations of user A. This change can trigger authentication sessions 402 (described in relation to FIG. 4A), which includes the EntitlementsModifiedOn attribute, to compare timestamps with respect to their copies of entitlements and the updated entitlements, and if necessary, cause the in-session refreshing of entitlements stored in a cache or other memory for lookup.

Figure 5:
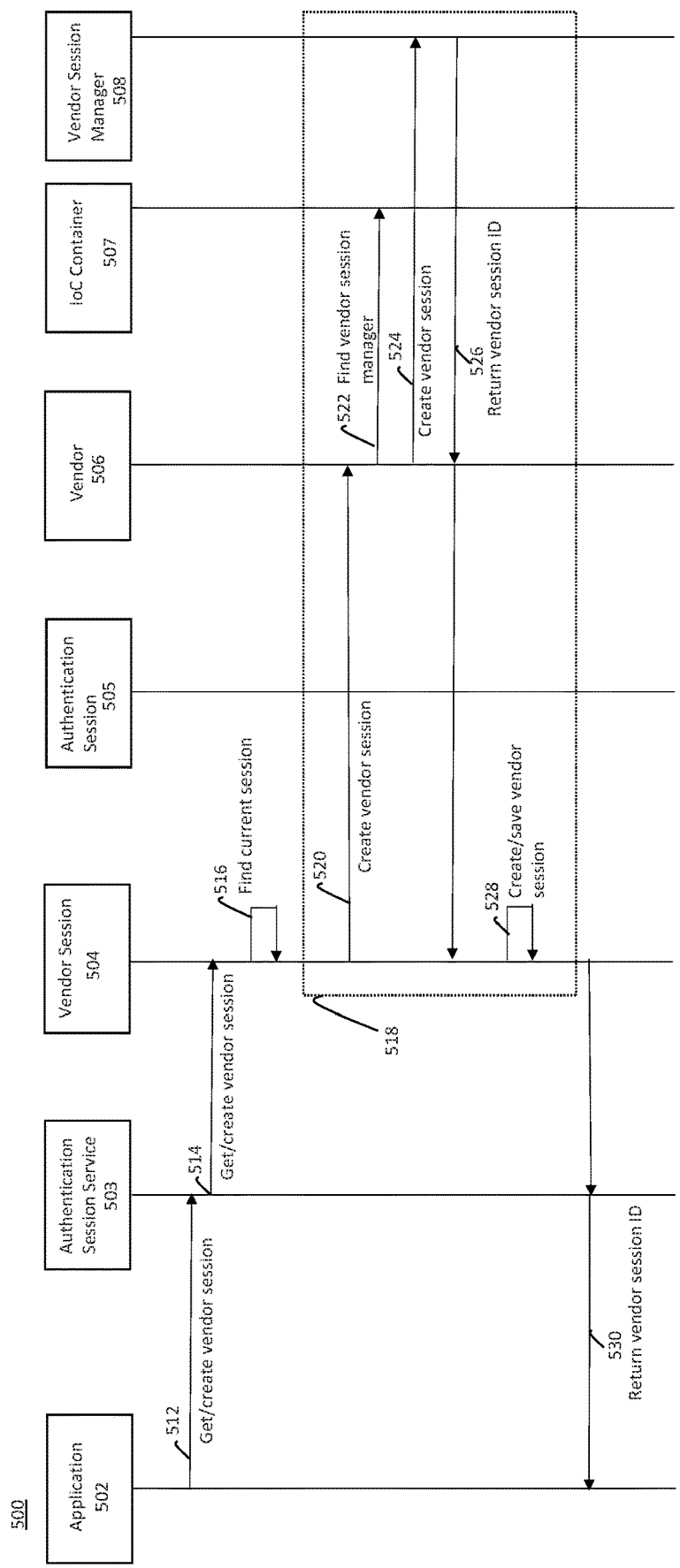
FIG. 5 illustrates a flow diagram showing an application obtaining an existing vendor session or creating a new vendor session, according to some example embodiments.

FIG. 5 illustrates an interaction diagram showing a process 500 including interactions that occur when an application, such as, for example, web application, seeks to obtain an existing vendor session or to create a new vendor session. A web application 112 may, for example, cause process 500 to be performed when a user signs-on to the web application and/or in association with creating a new authentication session.

At operation 512, an object of application class 502 calls a method for getting or creating a vendor session in an object of authentication session services class 503. The call may include a vendor name or other vendor identifier as a parameter. Object 502 may represent at least a portion of a running web application 112 or core services application 114. Object 503 may represent at least a portion of a core services application 114.

At operation 514, object 503 calls a method in an object of vendor session class 504 for finding or creating a vendor session. The vendor identifier may be passed as a parameter. Object 504 may be responsible for maintaining a vendor session table (e.g., table 206 or part thereof).

At operation 506, object 504 determined whether a currently active vendor session to the requested vendor exists. If a matching currently active vendor session is found, then processing proceeds to operation 530.

If, at operation 516, no active vendor session is found, then operation 518 may be performed to create a new vendor session. Operation 518 may include operations 520-528.

At operation 520, object 506 requests an object of vendor class 506 to create a vendor session. Object 506 may represent one or more vendors (e.g. external servers 106). Object 506 may, in some embodiments, request an inversion container "IoC container" 507 to dynamically provide a session manager for a specified vendor. In other embodiments, object 506 may have hardcoded the functionality to call an appropriate session manager for actually creating a vendor session.

Having identified an appropriate vendor session manager, at operation 524 object 506 requests an object of vendor session manager class 508 to create a session. Object 508 creates the new vendor session, and at operation 526 returns the session identifier to object 506 which in turn may return the session identifier to object 504. The creation of the new session by object 508 may include communicating with an appropriate external server (e.g., external server 106 corresponding to the vendor for whom a session is being created). For example, a process at an external server 106 may in response to a communication from object 508 regarding a new session being created, update its local copy of the vendor session table and/or provide its identifier and other parameters.

Object 504, at operation 528, may create a new table entry in a vendor session table (e.g. table 206) for the new session identifier.

At operation 530, the appropriate vendor session identifier is returned to objects 503 and 502.

Figure 6:
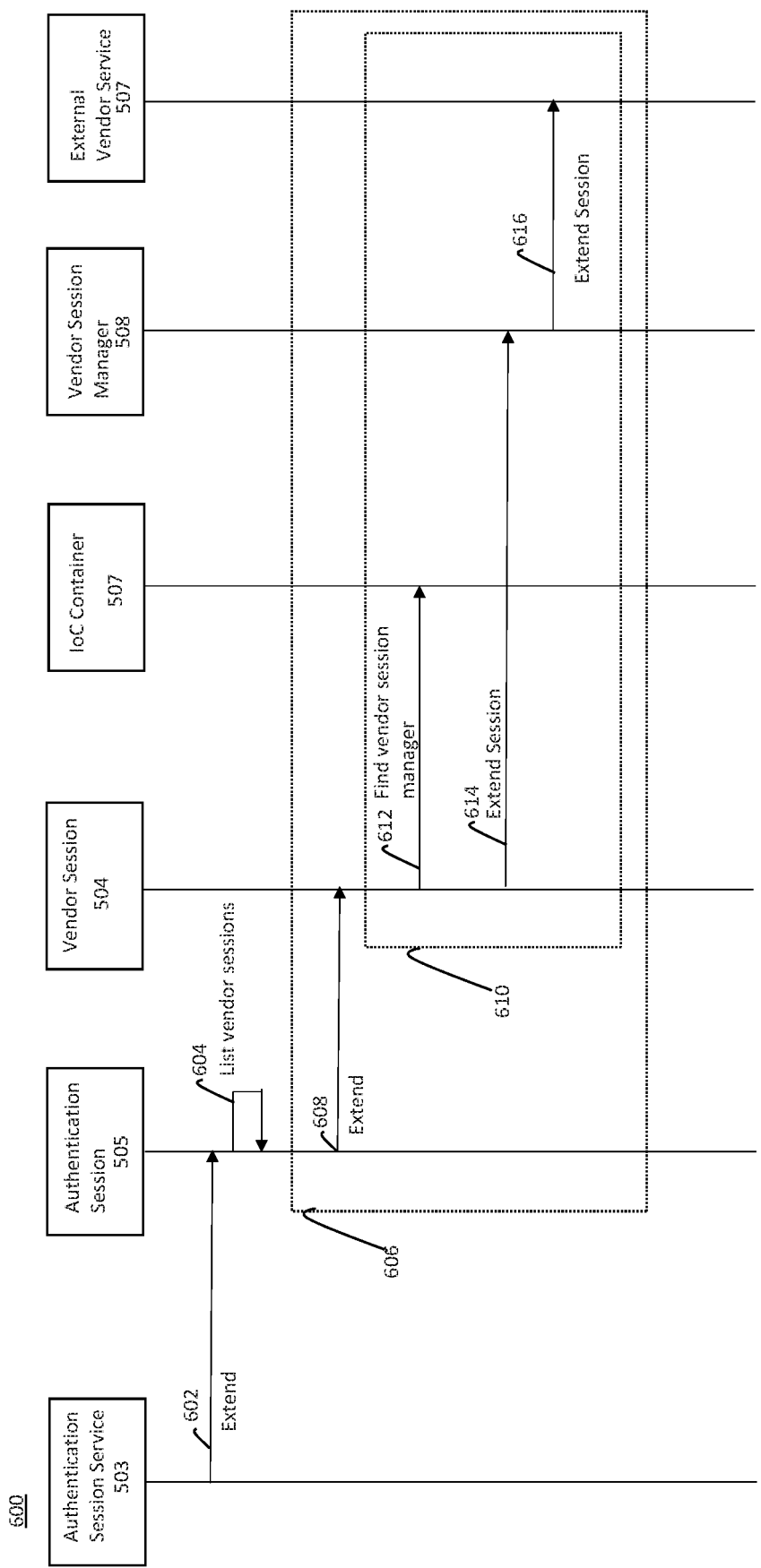
FIG. 6 illustrates a flow diagram showing an application seeking to extend an existing authentication session, according to some example embodiments.

FIG. 6 illustrates an interaction diagram showing a process 600 including interactions that occur when an application, such as, for example, web application, seeks to extend an existing authentication session. A web application 112 may, for example, cause process 600 to be performed while a authentication session is still active and it is noted that the authentication session is about to expire within a predetermined time interval.

An object 503 (e.g., of authentication session service class) at operation 602 may call a method of an authentication session class 505 to extend an active authentication session. This may be performed when an authentication session service determines that a user session is within a predetermined interval of being automatically terminated, or when the user actively requests that the session be extended. The interval for which a session is extended may be preconfigured or dynamically determined.

Object 505 may be responsible for controlling the authentication session. At operation 604, object 505 may determine all vendor sessions associated with the authentication session that is to be extended. Having identified one or more vendor sessions, operation 606 is performed to extend each vendor session as appropriate.

Operation 606 includes operations 608-610 being performed for each vendor.

At operation 608, object 505 calls vendor session 504 to extend the corresponding vendor session. Vendor session 504 determines if the vendor session is about to expire. If so, it initiates operation 610. Operation 610 includes operations 612-616.

Vendor session 504 may use an inversion container to find the appropriate session manager object at operation 612. Having located a session manager, object 504 now at operation 614 calls the session manager 508 to extend the session.

Session manager 508 may, at operation 616, invoke an external vendor service to extend the session.

Figure 7:
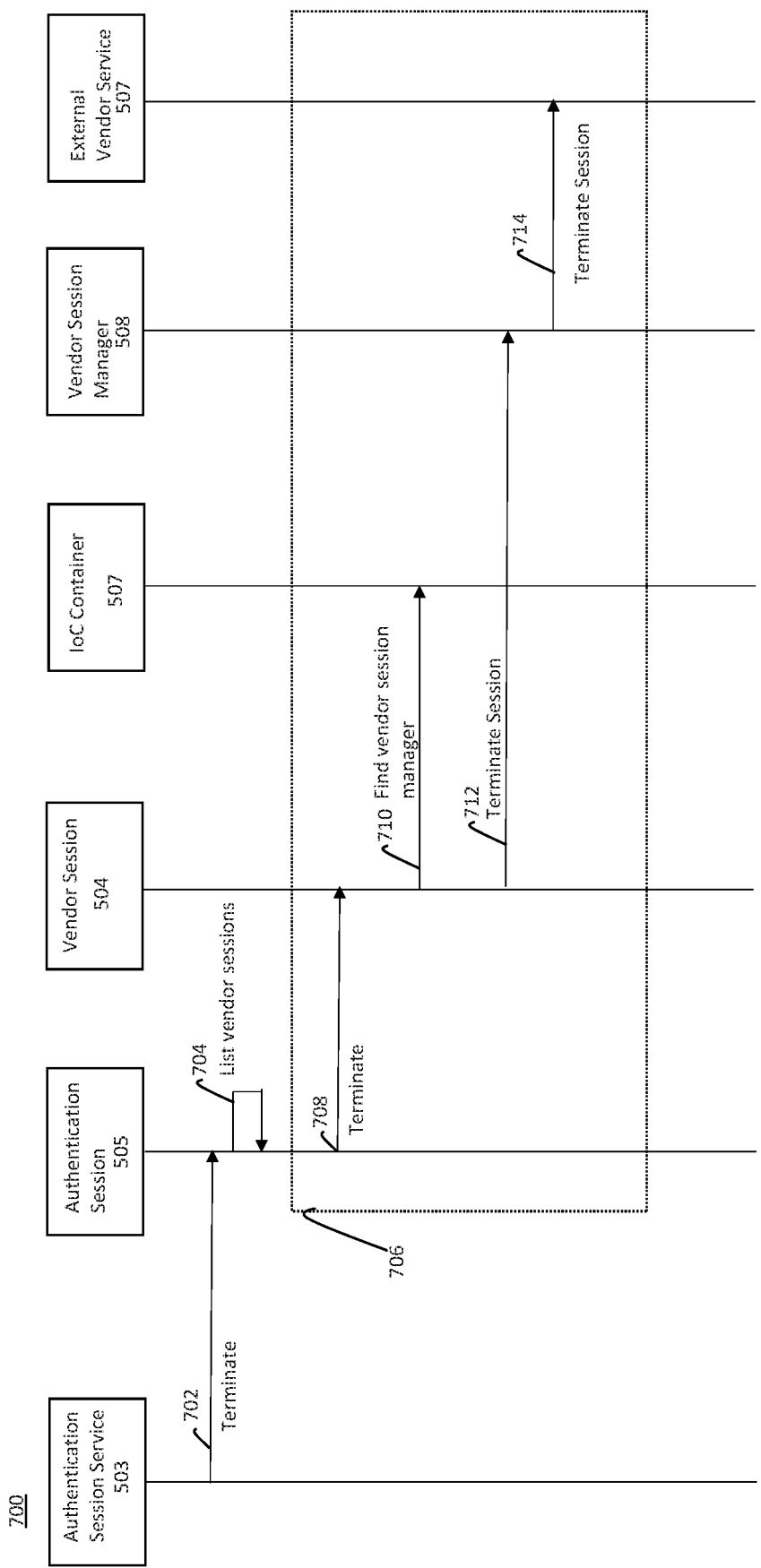
FIG. 7 illustrates a flow diagram showing an application seeking to terminate an existing authentication session, according to some example embodiments.

FIG. 7 illustrates an interaction diagram showing a process 700 including interactions that occur when an application, such as, for example, web application, seeks to terminate an existing authentication session. A web application 112 may, for example, cause process 700 to be performed when the user intentionally signs off or when a user is automatically signed off by the system.

An object 503 (e.g., of authentication session service class) at operation 702 may call a method of an authentication session class 505 to terminate an active authentication session. This may be performed when an authentication session service determines that a user is signing off or is being signed off.

Object 505 may be responsible for controlling the authentication session. At operation 704, object 505 may determine all vendor sessions associated with the authentication session that is to be terminated. Having identified one or more vendor sessions, operation 706 is performed to terminate each vendor session as appropriate.

Operation 706 includes operations 708-714 being performed for each vendor.

At operation 708, object 505 calls vendor session 504 to terminate the corresponding vendor session. Vendor session 504 determines if the vendor session is about to expire. If so, it initiates operation 710.

Vendor session 504 may use an inversion container to find the appropriate session manager object at operation 710. Having located a session manager, object 504 now at operation 712 calls the session manager 508 to terminate the session.

Session manager 508 may, at operation 714, invoke an external vendor service to terminate the session.

FIG. 8 illustrates part of example software code 800 for dynamically finding a session manager by name using an inversion container. The capability to dynamically find and instantiate a session manager instance makes it possible for the system to incorporate new vendors with different API requirements.

FIGS. 9A-9E illustrate templates of various example methods that may be used in interactions discussed in relation to FIGS. 5-7.

FIG. 9A shows a method that may be called to find a vendor session by specifying a vendor name. A new vendor session can be created if an existing vendor session is not found.

FIG. 9B shows a method that may be called for terminating a vendor session. A corresponding authentication session identifier and a vendor name or vendor session id may be provided. FIG. 7 illustrates interactions when a vendor session is terminated.

FIG. 9C shows a method that can be called to update entitlements at vendor sessions. A corresponding authentication session for which entitlements are updated, and the vendor name or vendor session identifier may be specified.

FIG. 9D shows a method that can be called to obtain vendor session information. The information may include information from the vendor representing the local state of the corresponding vendor session from the vendor.

FIG. 9E shows a method that can be called to create a new vendor session to be used for API calls to retrieve data on behalf of a given user. A string (or other data structure) may be passed as a parameter specifying the entitlements that are to be set to active for the session.

Figure 10:
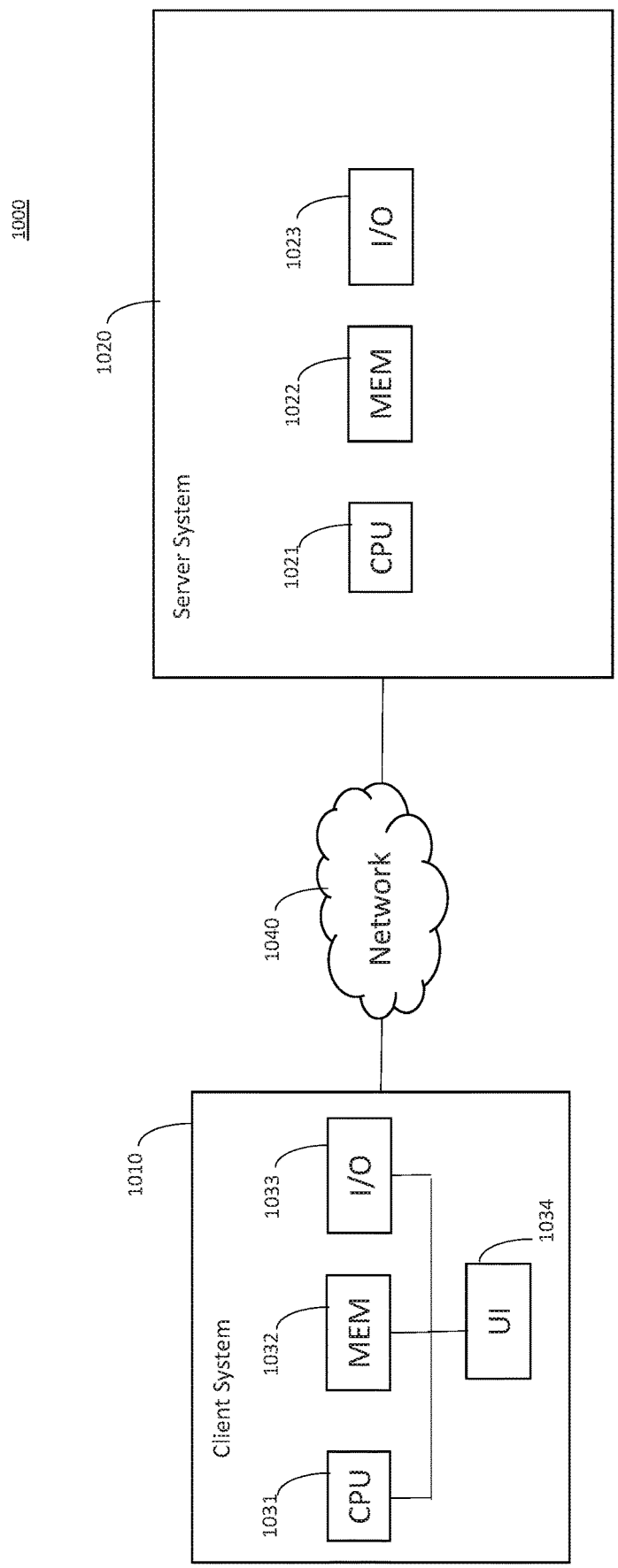
FIG. 10 schematically illustrates a computing environment in which the client devices and/or servers can be implemented, in accordance with some example embodiments.

FIG. 10 shows a non-limiting example block diagram of a hardware architecture for the system 100. In the example shown in FIG. 10, the client system 1010 communicates with a server system 1020 via a network 1040. The network 1040 could comprise a network of interconnected computing devices, such as the internet. The network 1040 could also comprise a local area network (LAN) or could comprise a peer-to-peer connection between the client system 1010 and the server system 1000.

The example client system 1010 and server system 1000 could correspond to clients 104 and server 102 as shown in FIG. 1. That is, the hardware elements described in FIG. 10 could be used to implement the various software components and actions shown and described herein with reference to FIG. 1. For example, the client system 1010 in FIG. 10 could include at least one processor CPU 1031, at least one memory 1032, at least one input/output device I/O 1033, and a component for generating and displaying a user interface UI 1034. The at least one memory 1032 may include a computer readable storage medium such as, for example, random access memory (RAM), static RAM, flash memory, magnetic disk. The I/O device 1033 can be all encompassing and could include a communication device, such as a transceiver for sending and receiving data (e.g., a wireless transceiver, a wired transceiver). I/O device 1033 could also include an interface for connecting a non-transitory computer readable storage medium to the client system 1010 to send and receive data.

It should be appreciated that the combination of elements in client system 1010 could be used to implement the example web browser applications 118, 117 and app 120a in FIG. 1. For example, the memory 1032 could load the files associated with the application (e.g., HTML, XML, JavaScript files) and the CPU 1031 could be used to execute instructions associated with the application. The I/O device 1033 could be utilized to fetch the various elements comprising the SPA from the server system 1020 and/or to interact with the user.

Server system 1020 also comprises various hardware components used to implement the software elements for server 102 as shown in FIG. 1 or 200 in FIG. 2. For example, server system 102 could also include hardware components of at least one processor CPU 1021, at least one memory 1022, and at least one input/output device I/O 1023. The at least one memory 1022 may include a computer readable storage medium such as, for example, random access memory (RAM), static RAM, flash memory, magnetic disk. The I/O device 1023 can be all encompassing and could include a communication device, such as a transceiver for sending and receiving data (e.g., a wireless transceiver, a wired transceiver). I/O device 1023 could also include an interface for connecting a non-transitory computer readable storage medium to the server system 1000 to send and receive data. In one example embodiment, I/O device 1033 of the client system can perform communication via the network with I/O 1023 of the server system.

Similar to client system 1010, the server system 1020 could implement and/or execute the applications. For example, the memory 1022 could be used to store the information in database 110 as well as the components and files utilized by web servers and application servers associated with, for example, the web applications 112 and core services 114. The CPU 1021 could be used in executing the software necessary to generate the respective modules that are requested by and transmitted to the client system 1010. For example, CPU 1021 could be used to generate the necessary modules created by an application server. Likewise, I/O device 1023 can be used by a web server to transmit the different application elements to the client system 1010. Of course, these examples are non-limiting and the system envisions utilizing the hardware elements in a variety of aspects.

The technology described above provides, among other things, improved capabilities for enterprises and/or third party service providers to exercise more control over how closely users of an enterprise web application are held to predetermined conditions for accessing various resources through the web application. For example, when a user's entitlements with respect to a particular resource are changed during an active session, unlike previously known web application deployments in which the updated entitlements do not become effective until user signs-off and signs back on, some embodiments refresh the active session to reflect the updated entitlements in real-time. The in-session refresh of entitlements improves the user experience by not requiring the session to be torn down and recreated each time a change to the entitlements is effected, helps the enterprise by enabling it to ensure that its users closely conform to predetermined conditions with respect to accessing various resources through its web application, and can potentially improve revenue for service providers by making it less likely that users can access resources without an up-to-date authentication and use conditions.

to exercise improve the efficiency with which users interact with web applications over communications networks, while also reducing misuse of the web application's resources. As described in more detail above, some embodiments may be used to control user access to various networked resources so that overall specifications of use for those resources are adhered to.

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits (e.g., as shown in FIG. 10), using software programs (e.g., as shown in FIG. 1) and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models, and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments.

While the technology has been described in relation to AngularJS, this is done for ease of description; it is to be understood that the technology described in this document is applicable in the context of other SPA technologies, other web technologies, and/or any other software technology.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. A method of providing a user of a client device with content from a web application, a server portion of the web application being executed on a server device and a client portion of the web application being executed on the client device, wherein at least part of the content provided to the user is obtained from an external server, the method comprising:

storing, in a memory of the server device, an entitlement associated with the user, wherein the entitlement represents a status of an authorization for the user to access the content;

creating a session by which the user communicates with the server portion of the web application via the client device, wherein said creating includes (1) forming a first portion of the session in the memory of the server device, and associating the first portion with the stored entitlement, and (2) causing a second portion of the session to be formed in a memory of the external server and to be associated with information regarding a current status of the stored entitlement; and while the session is indicated in the memory of the server device as being active:

receiving information regarding a change of the stored entitlement from the first status to a second status, in response to the receiving, causing said information stored in the memory of the external server to be updated according to the change from the first status to the second status, and in response to a plurality of requests received from the client device, (a) receiving portions of the content from the external server when the external server, by accessing the information stored in the memory of the external server, determines the current status of the stored entitlement as corresponding to the first status, and (b) being notified of a failure without receiving portions of the content when the external server, by accessing the information stored in the memory of the external server, determines the current status of the stored entitlement as corresponding to the second status.

2. The method according to claim 1, wherein said updating said information stored in the memory of the external server according to the change from the first status to the second status comprises updating a value corresponding to the current status of the stored entitlement in the memory of the external server.

3. The method according to claim 1, wherein a first part of the provided content is obtained from the external server and a second part of the provided content is obtained from another external server.

4. The method according to claim 3, further comprising, while the session is indicated in the memory of the server device as being active, causing said information stored in a memory of the other external server to be updated according to the change from the first status to the second status.

5. The method according to claim 4, wherein the external server, the other external server, and a second other external server each has a respective second portion of the session with the server device in relation to the user, and wherein causing information to be updated according to the change from the first status to the second status comprises, based upon a determination that the second other external server does not provide any part of said content subject to the entitlement, selecting not to cause a memory of the second other external server to be updated to reflect the second status of the entitlement.

6. The method according to claim 1, wherein the creating a session comprises creating a first session with a first session identifier between the client device and the at least one server device, creating a second session with a second session identifier between the server device and a plurality of external servers, wherein the first session is associated with the second session.

7. The method according to claim 6, wherein said creating the session further comprises associating a first timestamp with a data structure associated with the session, and wherein said receiving information comprises:
detecting, based upon the first timestamp, that the entitlement stored in the memory of the server device has changed; and
after the detecting, transmitting a current value of the entitlement stored in the memory of the server device to at least one of said external servers.

8. The method according to claim 1, wherein said storing the entitlement associated with the user comprises linking, in the memory of the server device, a first object representing the user to one or more second objects representing portions of the entitlement.

9. The method of claim 1, further comprising:
storing one or more first objects in the memory of the server device, each of the first objects representing a respective authorization to obtain the content from one or more external servers; and
for one of the first objects, configuring in memory of the server device one or more second objects representing the entitlement,
wherein storing the entitlement associated with the user includes storing a third object representing the user, and configuring links from said one of the first objects to the third object and from the third object to the one or more second objects.

10. A server comprising:
a memory;
a network interface; and
a processor communicatively coupled to the memory and the network interface, and configured to:
execute a server-portion of a web application of which a client portion is executed on a client device;
store, in the memory, an entitlement associated with a user of a client device, wherein the entitlement represents a status of an authorization for the user to access content from the web application, wherein at least part of the content provided to the user is obtained through the network interface from an external server;
create a session by which the user communicates with the server portion of the web application, wherein said creating includes (1) forming a first portion of the session in the memory, and associating the first portion with the stored entitlement, and (2) causing a second portion of the session to be formed in a memory of the external server and to be associated with said information regarding the current status of the stored entitlement; and
while the session is indicated in the memory server as being active:
receive information regarding a change of the stored entitlement from the first status to a second status,
in response to the receiving, update said information stored in the memory of the external serve according to the change from the first status to the second status, and
in response to a plurality of requests received from the client device over the network interface, (a) receive portions of the content from the external server when the external server, by accessing the information stored in the memory of the external server, determines the current status of the stored entitlement as corresponding to the first status, and (b) being notified of a failure without receiving portions of the content when the external server, by accessing the information stored in the memory of the external server, determines the current status of the stored entitlement as corresponding to the second status.

11. The server according to claim 10, wherein the processor is further configured to obtain a first part of the provided content from the external server and a second part of the provided content from another external server.

12. The server according to claim 11, wherein the processor is further configured to, while the session is indicated in the memory of the server as being active, cause information stored in a memory of the other external server to be updated according to the change from the first status to the second status.

13. The server according to claim 12, wherein the external server, the other external server, and a second other external server each has a respective second portion of the session with the server in relation to the user, and wherein the processor is further configured to, based upon a determination that a second other external server does not provide any part of said content subject to the entitlement, selecting not to cause a memory of the second other external server to be updated to reflect the second status of the entitlement.

14. A non-transitory computer readable storage medium storing instructions which, upon execution by a processor of a server, causes the server to perform operations comprising:
executing a server-portion of a web application of which a client portion is executed on a client device;
storing, in a memory of the server, an entitlement associated with a user of a client device, wherein the entitlement represents a status of an authorization for the user to access content from the web application, wherein at least part of the content provided to the user is obtained from an external server;
creating a session by which the user communicates with the server portion of the web application, wherein said creating includes (1) forming a first portion of the session in the memory of the server, and associating the first portion with the stored entitlement, and (2) causing a second portion of the session to be formed in a memory of the external server and to be associated with said information regarding a current status of the stored entitlement; and
while the session is indicated in the memory of the server as being active:
receiving information regarding a change of the stored entitlement from the first status to a second status,
in response to the receiving, updating said information stored in the memory of the external server according to the change from the first status to the second status, and
in response to a plurality of requests received from the client device, (a) receiving portions of the content from the external server when the external server, by accessing the information stored in the memory of the external server, determines the current status of the stored entitlement as corresponding to the first status, and (b) being notified of a failure without receiving portions of the content when said external server, by accessing the information stored in the memory of the external server, determines the current status of the stored entitlement as corresponding to the second status.

15. The non-transitory computer readable storage medium according to claim 14, wherein the operations include:

obtaining a first part of the provided content from the external server and a second part of the provided content from another external server; and, while the session is indicated in the memory of the server as being active, causing information stored in a memory of the other external server to be updated according to the change from the first status to the second status.

16. The non-transitory computer readable storage medium according to claim 15, wherein the external server, the other external server, and a second other external server each has a respective second portion of the session with the server in relation to the user, and wherein the operations include, based upon a determination that the second other external server does not provide any part of said content subject to the entitlement, selecting not to cause a memory of the second other external server to be updated to reflect the second status of the entitlement.

17. A system comprising a first server device and a second server device communicatively connected over a network, the first server device comprising:
   a first memory;
   a first network interface; and
   a first processor communicatively coupled to the first memory and the network interface, and configured to:
      execute a server-portion of a web application of which a client portion is executed on a client device;
      store, in the first memory, an entitlement associated with a user of a client device, wherein the entitlement represents a status of an authorization for the user to access content from the web application, wherein at least part of the content provided to the user is obtained from the second server device;
      create a session by which the user communicates with the server portion of the web application, wherein said creating includes (1) forming a first portion of the session in the first memory, and associating the first portion with the stored entitlement, and (2) causing a second portion of the session to be formed in a memory on the second server device and to be associated with said information regarding the current status of the stored entitlement; and
   while the session is indicated in the first memory as being active:
      receive information regarding a change of the stored entitlement from the first status to a second status,
      in response to the receiving, causing said information stored in the memory of the second server device to be updated according to the change from the first status to the second status, and
      in response to a plurality of requests received from the client device over the first network interface, (a) receive portions of the content from the second server device when the second server device, by accessing the information stored in the memory of the second server device, determines the current status of the stored entitlement as corresponding to the first status, and (b) being notified of a failure without receiving portions of the content when the second server device, by accessing the information stored in the memory of the second server device, determines the current status of the stored entitlement in as corresponding to the second status,
   and the second server device comprising:
      a second memory;
      a second network interface; and
      a second processor communicatively coupled to the second memory and the second network interface, and configured to:
         store said information regarding the current status of the stored entitlement in the second memory;
         in response to information received from the first server device, change said information regarding the current status from the first status to the second status;
         after the changing, in response to a plurality of requests received from the first server device over the second network interface, (a) transmit portions of the content from a storage device when it is determined that said information regarding the current status as corresponding to the first status, and (b) transmit a failure notification without transmitting portions of the content when it is determined that said information regarding the current status as corresponding to the second status.

18. The system according to claim 17, further comprising another external server, wherein the first processor is further configured to obtain a first part of the provided content from the external server and a second part of the provided content from the other external server.

19. The system according to claim 18, wherein the first processor is further configured to, while the session is indicated in the memory of the server as being active, causing information stored in a memory of the other external server to be updated according to the change from the first status to the second status.

20. The system according to claim 19, further comprising a second other external server, wherein the external server, the other external server, and a second other external server each has a respective second portion of the session with the server in relation to the user, and wherein the first processor is further configured to, based upon a determination that the second other external server does not provide any part of said content subject to the entitlement, selecting not to cause a memory of the second other external server to be updated to reflect the second status of the entitlement.

* * * * *